United States Patent
Xi et al.

(10) Patent No.: US 11,762,230 B2
(45) Date of Patent: Sep. 19, 2023

(54) TOUCH DISPLAY DEVICE

(71) Applicant: JRD COMMUNICATION (SHENZHEN) LTD., Shenzhen (CN)

(72) Inventors: Yafang Xi, Shenzhen (CN); Ke Lin, Shenzhen (CN); Ping Chen, Shenzhen (CN); Panwei Xiong, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 167 days.

(21) Appl. No.: 17/203,767

(22) Filed: Mar. 17, 2021

(65) Prior Publication Data

US 2022/0252920 A1 Aug. 11, 2022

(30) Foreign Application Priority Data

Feb. 9, 2021 (CN) .......................... 202110178554.0

(51) Int. Cl.
*G02F 1/1333* (2006.01)
*G02F 1/1335* (2006.01)
*G02F 1/1345* (2006.01)
*G06F 3/041* (2006.01)

(52) U.S. Cl.
CPC ...... *G02F 1/13338* (2013.01); *G02F 1/13452* (2013.01); *G02F 1/133331* (2021.01); *G02F 1/133514* (2013.01); *G02F 1/133536* (2013.01); *G02F 1/133616* (2021.01); *G06F 3/0412* (2013.01); *G06F 3/04164* (2019.05); *G02F 2201/50* (2013.01); *G06F 2203/04103* (2013.01)

(58) Field of Classification Search
CPC .......... G02F 1/13338; G02F 1/133331; G02F 1/133616; G06F 3/0412
See application file for complete search history.

(56) References Cited

U.S. PATENT DOCUMENTS

| | | | |
|---|---|---|---|
| 9,097,825 B1* | 8/2015 | Gupta | G02B 6/0031 |
| 2004/0109097 A1* | 6/2004 | Mai | G02F 1/13338 |
| | | | 349/12 |
| 2008/0062140 A1* | 3/2008 | Hotelling | G02F 1/134363 |
| | | | 345/173 |
| 2009/0086113 A1* | 4/2009 | Ko | G06F 3/0443 |
| | | | 200/600 |
| 2017/0176835 A1* | 6/2017 | Gupta | G02B 6/0036 |
| 2017/0371447 A1 | 12/2017 | Fukushima | |
| 2020/0301559 A1 | 9/2020 | Kubo | |
| 2020/0371627 A1* | 11/2020 | Luo | H10K 59/131 |

OTHER PUBLICATIONS

European Search Report, European Application No. 21162858.1, dated Sep. 2, 2021 (9 pages).

* cited by examiner

*Primary Examiner* — Jessica M Merlin
(74) *Attorney, Agent, or Firm* — PV IP PC; Wei Te Chung; Zhigang Ma

(57) ABSTRACT

The application discloses a touch display device including a touch display panel and a light source structure. The touch display panel has a first side used to display and a second d side opposite to the first side. The touch display panel includes a color filter substrate and an array substrate. The color filter substrate includes a color filter base having a first surface. The array substrate includes an array base having a second surface. At least one touch wiring layer is arranged on one of the first surface and the second surface. A light source structure arranged on a display side of the touch display panel is used to emit light to the touch display panel.

13 Claims, 2 Drawing Sheets

TOUCH DISPLAY DEVICE

CROSS REFERENCE

The present application claims priority of Chinese Patent Application No. 202110178554.0, filed on Feb. 9, 2021, in the National Intellectual Property Administration of China, the entire contents of which are hereby incorporated by reference in its entirety.

TECHNICAL FIELD

The present disclosure relates to the field of display technologies, and in particular to a touch display device.

BACKGROUND

With the continuous development of communication technology, smart terminals such as smart phones, tablet computers and notebook computers are developing in a direction of diversification and personalization. With the development of digital technology, displays have taken place of traditional information carrier such as papers on many occasions. There are many types of displays, and liquid crystal displays are the most widely used.

The light emitted by the backlight of the liquid crystal display includes blue light which is harmful to eyes. Thus the traditional liquid crystal displays can cause serious and irreversible damage to the eyes. Display manufacturers have developed a reflective liquid crystal display (referred to as RLCD). The reflective liquid crystal displays can light up the screen by reflecting the light of natural environment. Thus the backlight is no longer needed, which can eliminate harmful blue light and meet needs of the users to protect eyes. And when equipped with a touch-sensitive structure, the RLCD can support the touch control function.

Besides, existing reflective liquid crystal display devices supporting touch function are all plug-in touch solutions. That is, the touch component is formed by fabricating the touch wiring layer on a substrate such as glass. And then the touch component is bonded between the cover plate and the reflective liquid crystal display panel with optical glue. The substrate carrying the touch trace layer is relatively thick (above 40 um), it is not conducive to design and realization of ultra-thin products.

BRIEF DESCRIPTION OF THE DRAWINGS

In order to describe the technical solutions of the specific embodiments of the present disclosure more clearly, the drawings used in the description of the embodiments of the present disclosure will be briefly introduced below.

DETAILED DESCRIPTION

Figure 1:
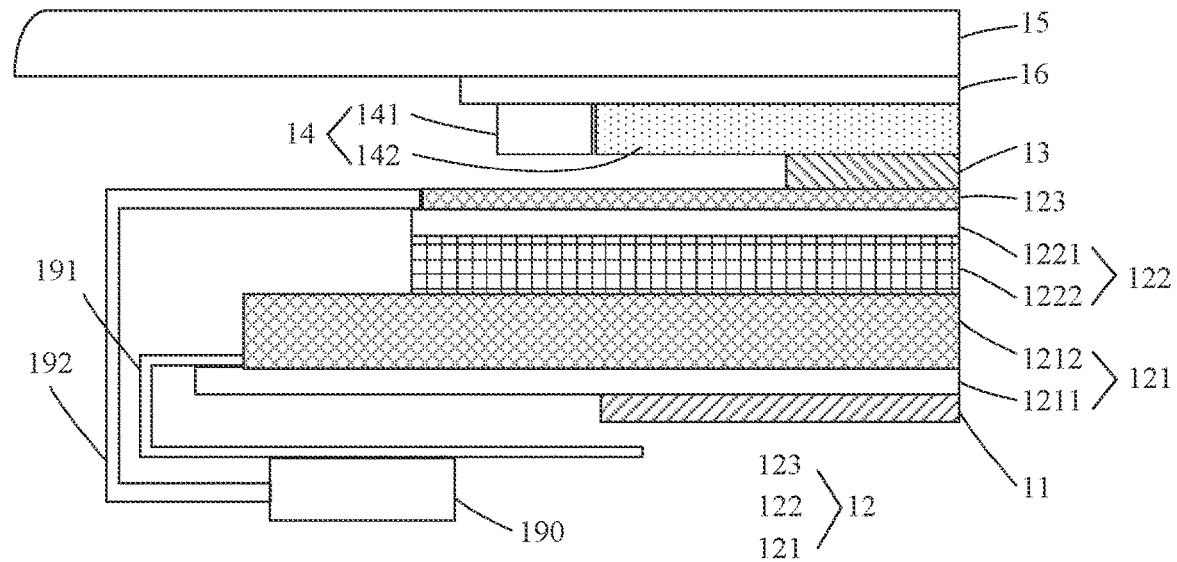
FIG. 1 is a structural schematic diagram of a touch display device according to a first embodiment of the present disclosure.

The technical solutions in the embodiments of the present disclosure will be clearly and completely described below in conjunction with the accompanying drawings in the embodiments of the present disclosure. The same or similar reference numbers from beginning to end in the embodiments of the present disclosure indicate the same or similar components or components with the same or similar functions.

The terms "first", "second" and "third" (if exists) in the specification and claims of the present disclosure and the above drawings are used to distinguish similar objects, and they are not used to describe a specific order or sequence. It should be understood that the objects described in this way can be interchanged with each other under appropriate circumstances. Besides, in the description of the present disclosure, "multiple" means two or more, unless otherwise expressly and specifically limited. In addition, the terms "including" and "having" and any variations thereof are intended to cover non-exclusive inclusions. The directional terms mentioned in description of the present disclosure, for example: "up", "down", "left", "right", "front", "back", "inside", "outside", "side", etc., are only the directions with reference to the drawings.

The present disclosure provides a touch display device including a touch display panel and a light source structure. The touch display panel includes a touch wiring layer, a color filter substrate and an array substrate opposite to the color filter substrate. The touch display panel has a first side configured to display and a second side opposite to the first side. The light source structure can be disposed on the first side of the touch display panel to emitting light to the touch display panel. The color filter substrate includes a color filter base having a first surface. The array substrate includes an array base having a second surface. At least one touch wiring layer is arranged on one of the first surface and the second surface. That is, a touch display device with a front light source structure can be provided in the present disclosure. The touch display device adopts an improved In-Cell (embedding touch panel function into a liquid crystal pixel, generally mixing with the liquid crystal layer) or an improved On-Cell (embedding a touch screen between the color filter substrate and a polarizer of a display screen, that is, assembling a touch sensor on a LCD panel) method to achieve a touch display function. Compared with the existing reflective liquid crystal display device which utilizes the Plug-in touch solution, the present disclosure can effectively reduce the thickness of the product and is beneficial to the realization of ultra-thin product design. Moreover, the present disclosure can utilize the color filter base or the array substrate base to carry the touch wiring layer. Thus, there is no need to provide a separate substrate for the touch wiring layer, which can reduce the thickness and the cost of the product effectively. Besides, this application can be applied to RLCD display screens or ink screens with a front light source structure, which can effectively reduce the damage caused by the display to human eyes and improve the display effect. Detailed descriptions are given below in conjunction with accompanying drawings.

Figure 2:
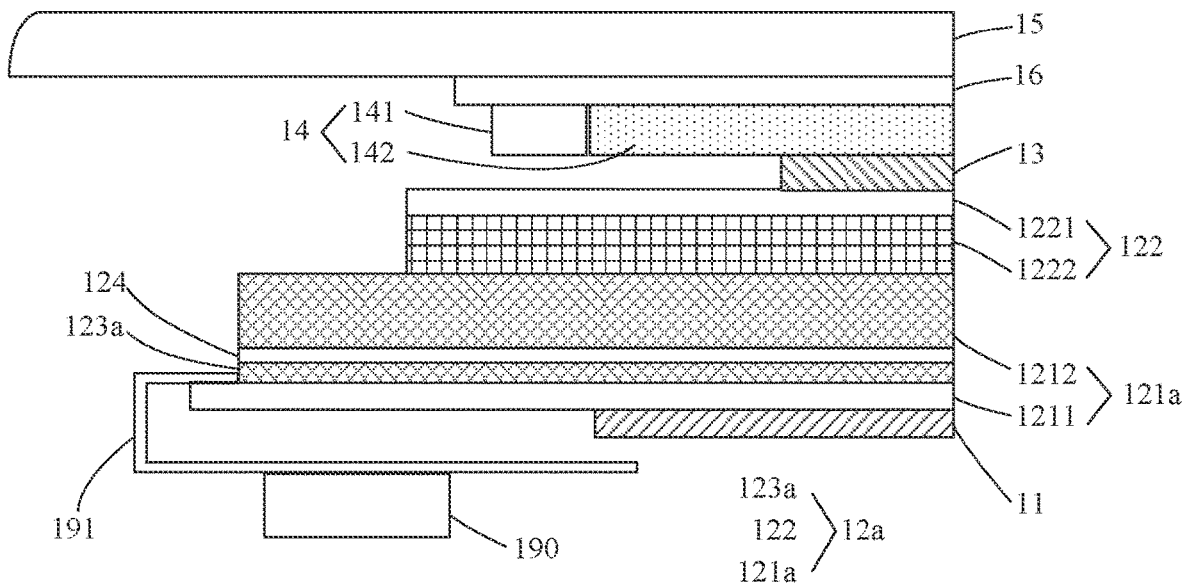
FIG. 2 is a structural schematic diagram of a touch display device according to a second embodiment of the present disclosure.
Figure 3:
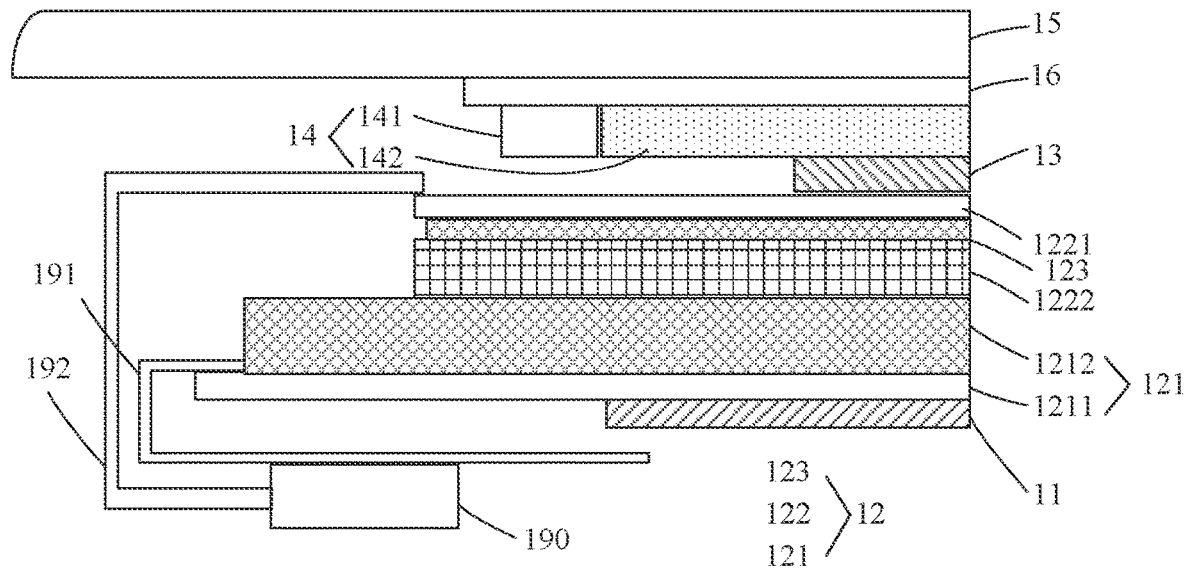
FIG. 3 is a structural schematic diagram of a touch display device according to a third embodiment of the present disclosure.

FIG. 1 is a structural schematic diagram of a touch display device according to a first embodiment of the present disclosure, FIG. 2 is a structural schematic diagram of a touch display device according to a second embodiment of the present disclosure, FIG. 3 is a structural schematic diagram of a touch display device according to a third embodiment of the present disclosure. As shown in FIGS. 1 to 3, the touch display device of the embodiment includes a first polarizer (POL) 11, a touch display panel 12, a second polarizer 13, a light source structure 14, and a cover plate 15 arranged in sequence.

Specifically, the first polarizer 11 is disposed on one side of the touch display panel 12 departing from a display side of the touch display panel 12. In one embodiment, the first polarizer 11 is a reflective polarizer, and correspondingly, the touch display device is a reflective touch display device.

Specifically, the touch display panel includes a first side configured to display and a second side opposite to the first side. The first polarizer 11 is disposed on the second side of the touch display panel 12. The touch display panel 12 includes at least one touch wiring layer 123, a color filter substrate 122 and an array substrate 121 arranged opposite to the color filter substrate 122. The color filter substrate 122 comprises a color filter base 1221 and a color resist layer 1222. The color filter base 1221 has a first surface. The array substrate 121 comprises an array base 1211 and an array device layer 1212, the array base 1211 has a second surface.

In this embodiment, the at least one touch wiring layer 123 can be disposed on one of the first surface and the second surface. A light source structure can be arranged on the first side of the touch display panel and used to emit light to the touch display panel. Thus, the touch wiring layer 123 can recognize a touching action of the finger on the screen and realize a function of touch control.

In this embodiment, the touch wiring layer 123 has a relatively thin film thickness (approximately a few microns or even nanometers). Therefore, the thickness of the overall film layer of the touch display panel 12 will not change significantly during a manufacturing process of the touch display panel 12. Thus, the overall thickness of the touch display device can be effectively reduced. It should be noted that, in other embodiments, the touch wiring layer 123 may be disposed between the color filter base 1221 of the color filter substrate 122 and the color resist layer 1222. A protective layer can be arranged between the touch wiring layer 123 and the color resist layer 1222.

In one embodiment, the color filter substrate 122 comprises a color filter base 1221 and a functional film layer (such as RGB color resist, black matrix, etc.). A touch wiring layer 123 may be formed on one surface of the filter base 1221 departing from the functional film layer by printing, etching or evaporating. The touch wiring layer 123 can be pre-prepared on one surface of the filter base 1221. The color filter base has a first surface and a third surface opposite to the first surface. The at least one touch wiring layer 123 can be disposed on the first surface, and the functional film layer of the color filter substrate 122 can be formed on the third surface of the color filter base 1221. This production method can avoid production processes of the touch wiring layer 123 make influences on the functional film layer of the color filter substrate 122. Alternatively, the functional film layer of the color filter substrate 122 may be produced on one surface of the color filter base 1221 first, and then the touch wiring layer 123 may be produced on the third surface of the color filter base 1221. And this production method can be compatible with existing film production processes.

In one embodiment, the touch wiring layer 123 has a fourth surface which is not in contact with the first surface of the color filter base. A protective layer is coated on the fourth surface of the touch wiring layer 123 to isolate the touch wiring layer.

In one embodiment, the functional film layer is a color resist layer.

In one embodiment, the material of the color filter substrate 122 is selected from one of the following: transparent materials such as Polyterephthalic acid plastic (mainly including polyethylene terephthalate PET and polybutylene terephthalate PBT), polycarbonate (PC), polymethylmethacrylate (PMMA), glass, etc. The material of the array substrate 121 can be selected from one of the following: transparent materials such as polyterephthalic acid plastic, polycarbonate (PC), polymethylmethacrylate (PMMA), glass, etc. The material of the color filter substrate 122 and the substrate of the array substrate 121 may be the same or different. The material of the touch wiring layer 123 can be selected from one of the following: indium tin oxide (ITO) or silver (Ag).

In this embodiment, the array device layer 1212 includes all film layers that constitute a driving circuit for driving the touch display panel 12 to display. For example, the array device layer 1212 includes all film layers of the touch display panel 12 constituting the driving circuit for driving the display panel 12 to display. For example, the array device layer 1212 includes a patterned active layer (Active layer), a gate insulating layer (GI), a patterned gate metal layer (GE), an interlayer insulating layer (ILD), a patterned source and drain metal layer (SD) and a Planarization layer (PLN) sequentially formed on the array base 1211, etc. Liquid crystal molecules or electronic ink (not shown in the figure) can be filled between the color filter substrate 122 and the array substrate 121. And when the material between the color filter substrate 122 and the array substrate 121 is liquid crystal molecules, the touch display panel 12 may be a RLCD. And when the material between the color filter substrate 122 and the array substrate 121 is electronic ink, the touch display panel 12 may be an ink screen.

Specifically, the second polarizer 13 is disposed on a first side of the touch display panel 12 and located between the touch display panel 12 and the light source structure 14.

Specifically, the light source structure 14 may be disposed on the first side of the touch display panel 12 and used to emit light towards the touch display panel 12. Wherein, the light source structure 14 includes a light source assembly 141 and a light guide plate (LGP) 142. The light source assembly 141 and the light guide plate 142 are arranged on the first side of the touch display panel 12 side by side. Specifically, the light source assembly 141 and the light guide plate 142 are arranged on one side of the second polarizer 13 departing from the touch display panel 12. Since the light source assembly 141 is located on one side of the light guide plate 142, the light emitted by the light source assembly 141 can enter the light guide plate 142 through a side surface of the light guide plate 142. That is to say, the light emitting from the light source assembly 141 does not enter the touch display panel 12 or the environment directly, but enters the light guide plate 142 through the side surface of the light guide plate 142. The light entering the light guide plate 142 can be totally reflected, and The light can enter the touch display panel 12. Specifically, the light source assembly 141 may be an LED. The light guide plate 142 may be formed of materials such as polymethylmethacrylate (PMMA) or polycarbonate (PC). The light guide plate 142 can make the light emitting from the light source assembly 141 spread to the touch display panel 12 more evenly. That is, the light source structure 14 can emit uniform light to the touch display panel 12, thereby improving a display effect and reducing a damage caused by the display to human eyes.

Specifically, a cover plate 15 can be disposed on the one side of the light source structure 14 departing from the touch display panel 12. In one embodiment, a glue layer 16 such as Optical Clear Resin (OCR) or Optically Clear Adhesive (OCA) may be used to bond the cover plate 15 and the light source structure 14. The material of the cover plate 15 can be selected from one of the following: Polyterephthalic acid plastic (mainly including polyethylene terephthalate PET and polybutylene terephthalate PBT), polycarbonate (PC), polymethyl methacrylate (PMMA), Glass and other transparent materials. The material of the cover plate 15, the substrate of the color filter substrate 122, and the substrate of the array substrate 121 may be the same or different. It should be noted that, this application provides examples of various specific processes and materials, but a person skilled in the art can be aware of the application of other processes and/or the use of other materials.

In another embodiment, the apparatus further includes: a panel driving device 190. The panel driving device 190 is arranged on the second side of the touch display panel 12 (specifically arranged on one side of the first polarizer 11 departing from the touch display panel 12). And the panel driving device can be connected to the array substrate 121 through the first flexible circuit board 191 (specifically connected to the array device layer of the array substrate 121). The panel driving device 190 can be used to perform display driving control on the touch display panel 12.

In this embodiment, the touch wiring layer 123 disposed on the color filter substrate 122 is connected to the panel driving device 190 through a second flexible circuit board 192. The touch wiring layer 123 can be controlled by the panel driving device 190 to realize a touch control function.

Specifically, the touch display device may be any products or components that have touch control and touch display functions, such as an e-reader, a mobile phone, a tablet computer, a TV, a monitor, a notebook computer, a digital photo frame, a navigator, and the like.

Figure 4:
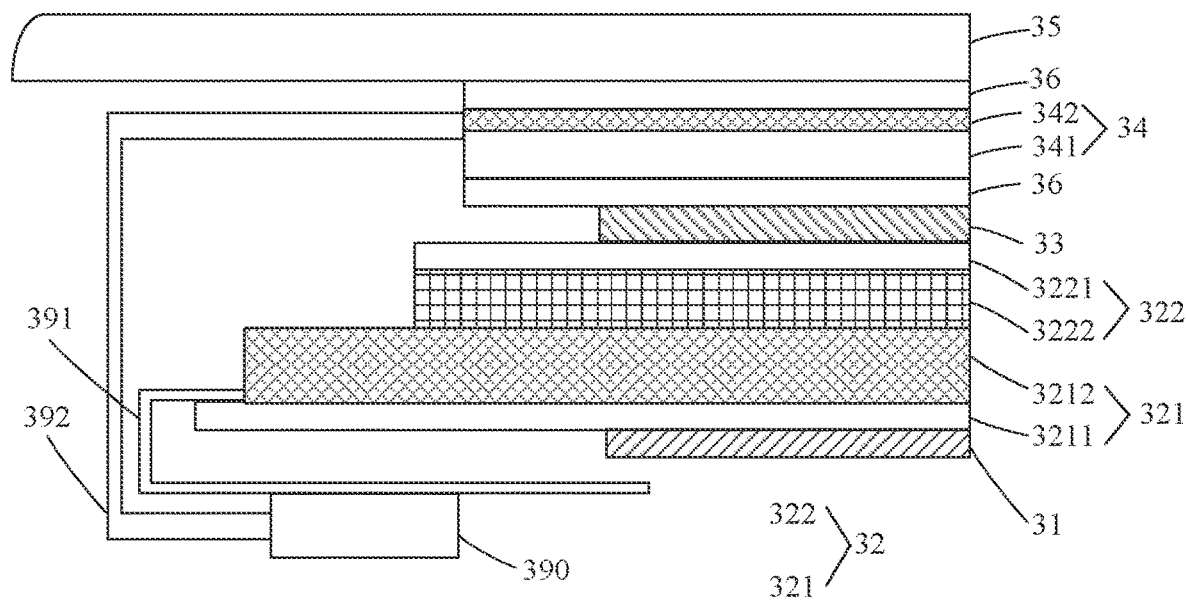
FIG. 4 is a structural schematic diagram of a related reflective liquid crystal display device supporting touch function.

Referring to FIG. 4, an existing reflective liquid crystal display device supporting touch control function is given as a contrast. As shown in FIG. 4, the existing reflective liquid crystal display device supporting the touch control function includes: a first polarizer 31, a liquid crystal display panel 32, a second polarizer 33, a touch control component 34, and a cover 35. The liquid crystal display panel 32 includes a color filter substrate 322 (including a color filter base 3221 and a color resist layer 3222) and an array substrate 321 arranged oppositely (including an array base 3211 and an array device layer 3212). The touch control component 34 includes a glass substrate 341 and a touch wiring layer 342 formed on the glass substrate 341. The touch control component 34 are adhered to the second polarizer 33 and the cover 35 through the adhesive layer 36 respectively. The apparatus further includes a panel driving device 390. The panel driving device 390 can be connected to the array substrate 321 through a first flexible circuit board 391. The panel driving device 390 also can be connected to the array substrate 321 through a first flexible circuit board 391. The touch control component 34 is connected to the panel driving device 390 through a second flexible circuit board 392. And the glass substrate 341 is relatively thick (above 40 um), which makes the overall film layer of the touch control component 34 thicker. As a result, the overall product thickness of the existing reflective liquid crystal display device supporting the touch control function is thicker and the cost is higher, the brightness of this touch display also need to be improved.

Comparing with FIG. 4, it should be note that, in the embodiment, a touch display device with a front light source structure is provided by arranging a light source structure on the display side of the touch display panel, and arranging a touch wiring layer on the surface of the color filter substrate. Compared with the existing reflective liquid crystal display device utilizing the Plug-in touch solution, the embodiment of the present disclosure can effectively reduce the thickness of the product and is beneficial to the realization of ultra-thin product design. Moreover, the substrate of the color filter substrate can be used to carry the touch wiring layer. Thus, there is no need to provide a separate substrate for the touch wiring layer, which can reduce the thickness and the cost of the product effectively. Since this application can utilize the substrate of the color filter substrate or the substrate of the array substrate to carry the touch wiring layer. Then, there is no need to provide a substrate for the touch wiring layer separately, which can reduce the thickness of the product and reduce the cost effectively. In addition, this embodiment can be applied to RLCD display screens or ink screens with a front light source structure, which can reduce the damage caused by the display to human eyes and improve the display effect effectively.

FIG. 2 is a schematic structural diagram of a touch display device according to a second embodiment of the present disclosure. As shown in FIG. 2, the difference between this embodiment and the embodiment shown in FIG. 1 is, in this embodiment, the touch wiring layer 123a is disposed between the array base 1211 of the array substrate 121a and the array device layer 1212. And a protective layer 124 is arranged between the touch wiring layer 123a and the array device layer 1212.

In one embodiment, the touch wiring layer 123a may be formed one side surface of the array base 1211 by printing, etching or evaporating. And a protective layer 124 can be coated on one surface of the touch wiring layer 123a departing from the array base 1211. The protective layer 124 can be used to isolate the touch wiring layer 123a for protection. And the array substrate 121a of the array device layer 1212 can be produced. It should be noted that, this application provides examples of various specific processes and materials, and a person skilled in the art can be aware of the application of other processes and/or the use of other materials.

Correspondingly, the apparatus further includes a panel driving device 190. The panel driving device 190 can be arranged on a second side of the touch display panel 12a (Specifically disposed on the side of the first polarizer 11 departing from the touch display panel 12a). And the panel driving device 190 can be connected to the array substrate 121a through the first flexible circuit board 191 (specifically connected to the array device layer on the array substrate 121a). The panel driving device 190 can be used to perform display driving control on the touch display panel 12a. And the touch wiring layer 123a is disposed on the array substrate 121a. Therefore, the touch wiring layer 123a may be connected to the panel driving device 190 through the first flexible circuit board 191, so that the touch wiring layer 123a can be controlled by the panel driving device 190 to achieve a touch control function. That is, the panel driving device 190 can realize the display driving control and touch control of the touch display panel 12a only by a flexible circuit board.

In this embodiment, a light source structure is provided on the display side of the touch display panel. And a touch wiring layer is provided on the surface of the color filter substrate, thereby a touch display device with a front light source structure is provided. Compared with the existing reflective liquid crystal display device utilizing the Plug-in touch solution, the present disclosure can effectively reduce the thickness of the product and is beneficial to the realization of ultra-thin product design. Moreover, the present disclosure utilizes the substrate of the array substrate to carry the touch wiring layer, and there is no need to provide a separate substrate for the touch wiring layer, which can reduce the thickness of the product and reduce the cost effectively. Since this application can utilize the substrate of the array substrate to carry the touch wiring layer, there is no need to provide a substrate for the touch wiring layer separately, which can reduce the thickness of the product and reduce the cost effectively. And this application also can be applied to RLCD display screens or ink screens with a front light source structure, reducing the damage caused by the display to human eyes effectively and improving the display effect.

In the above embodiments, the description of each embodiment has its own focus, and the parts that are not described in detail in a certain embodiment can be found in the relevant descriptions of other embodiments. Based on the embodiments in the present disclosure, all other embodiments obtained a person skilled in the art without making creative labor fall within the scope of the present disclosure.

As mentioned above, a person skilled in the art should understand that the technical solutions recorded in the foregoing embodiments may be modified, or equivalent replacement of some of the technical features may be made. The modifications or replacements do not make the essence of the corresponding technical solutions out of the scope of the technical solutions of the embodiments of the present disclosure.

What is claimed is:

1. A touch display device, comprising:
    a touch display panel having a first side configured to display and a second side opposite to the first side, the touch display panel comprising:
    a color filter substrate comprising a color filter base having a first surface; and
    an array substrate opposite to the color filter substrate and comprising an array base having a second surface; and
    at least one touch wiring layer arranged on one of the first surface and the second surface;
    a light source structure being arranged on the first side of the touch display panel and configured to emit light to the touch display panel;
    a first polarizer, arranged on the second side of the touch display panel; and
    a second polarizer, arranged on the first side of the touch display panel and located between the touch display panel and the light source structure.

2. The touch display device according to claim 1, wherein the first polarizer is a reflective polarizer.

3. The touch display device according to claim 1, further comprising a panel driving device, the panel driving device is arranged on the second side of the touch display panel, and the panel driving device is connected to the array substrate through a first flexible circuit board.

4. The touch display device according to claim 3, wherein the at least one touch wiring layer is connected to the panel driving device through a second flexible circuit board.

5. The touch display device according to claim 1, wherein the color filter substrate further comprises a functional film layer, the color filter base has a third surface opposite to the first surface;
    the at least one touch wiring layer is disposed on the first surface; and
    the functional film layer is disposed on the third surface.

6. The touch display device according to claim 5, the functional film layer is a color resist layer.

7. The touch display device according to claim 6, wherein the at least one touch wiring layer has a fourth surface which is not in contact with the first surface of the color filter base;
    a protective layer is coated on the fourth surface of the at least one touch wiring layer to isolate the at least one touch wiring layer.

8. The touch display device according to claim 1, wherein the light source structure comprises a light source assembly and a light guide plate, the light source assembly and the light guide plate are arranged on the first side of the touch display panel side by side.

9. The touch display device according to claim 8, further comprising a cover plate, arranged on one side of the light source structure away from the touch display panel.

10. The touch display device according to claim 9, wherein the cover plate and the light source structure are bonded by optical clear resin or optically clear adhesive, a material of the cover plate is selected from one of polyterephthalic acid plastic, polycarbonate, polymethyl methacrylate and glass.

11. The touch display device according to claim 10, wherein a material of the color filter substrate is selected from one of polyterephthalic acid plastic, polycarbonate, polymethyl methacrylate and glass;
    a material of the array substrate is selected from one of polyterephthalic acid plastic, polycarbonate, polymethyl methacrylate and glass.

12. The touch display device according to claim 11, wherein a material of the at least one touch wiring layer is indium tin oxide or silver.

13. The touch display device according to claim 8, wherein the light source assembly and the light guide plate are arranged on the first side of the touch display panel.

* * * * *